United States Patent [19]
Fukumasa et al.

[11] Patent Number: 6,018,545
[45] Date of Patent: Jan. 25, 2000

[54] COMMUNICATIONS DEVICE EMPLOYING SPECTRUM SPREADING IN TRANSMITTED BITS ALONG A TIME AXIS

[75] Inventors: Hidenobu Fukumasa; Yasuyuki Oishi; Hideto Furukawa; Kazuo Nagatani; Yoshiharu Tajima, all of Kawasaki, Japan

[73] Assignee: Fujitsu Limited, Kawasaki, Japan

[21] Appl. No.: 08/820,552

[22] Filed: Mar. 19, 1997

[30] Foreign Application Priority Data

May 31, 1996 [JP] Japan .................................. 8-139268

[51] Int. Cl.[7] .................................................. H04K 1/00
[52] U.S. Cl. .......................................... 375/206; 375/347
[58] Field of Search ..................... 375/206, 200, 375/260, 267, 285, 296, 299, 345, 346, 347, 367; 371/2.1, 30, 37.04; 370/203, 208, 209, 320, 335, 342, 441, 479; 341/61, 81, 94

[56] References Cited

U.S. PATENT DOCUMENTS

| | | | |
|---|---|---|---|
| 4,330,799 | 5/1982 | Price | 360/40 |
| 4,481,640 | 11/1984 | Chow et al. | 375/84 |
| 4,518,947 | 5/1985 | Poston et al. | 341/81 |
| 4,962,507 | 10/1990 | Renshaw | 370/342 |
| 5,274,667 | 12/1993 | Olmstead | 375/1 |
| 5,315,615 | 5/1994 | DeLisle et al. | 375/1 |
| 5,315,616 | 5/1994 | DeLisle et al. | 375/1 |
| 5,349,606 | 9/1994 | Lovell et al. | 375/1 |
| 5,504,773 | 4/1996 | Padovani et al. | 375/200 |
| 5,644,590 | 7/1997 | Sugita | 375/200 |
| 5,666,352 | 9/1997 | Ohgoshi et al. | 370/206 |
| 5,680,395 | 10/1997 | Weaver, Jr. et al. | 370/331 |
| 5,712,869 | 1/1998 | Lee et al. | 375/206 |

FOREIGN PATENT DOCUMENTS

| | | |
|---|---|---|
| 0 400 314 | 12/1990 | European Pat. Off. . |
| 2 298 341 | 8/1996 | United Kingdom . |

OTHER PUBLICATIONS

Geraniotis, E. and Gluck, J.W., "Coded FH/SS Communications in the Presence of Combined Partial–Band Noise Jamming, Rician Nonselective Fading, and Multiuser Interference," IEEE Jour. On Sel. Areas In Communications, vol. SAC–5, No. 2, pp. 194–214, Feb. 1987.

Viterbi, Andrew J., "Very Low Rate Convolutional Codes for Maximum Theoretical Performance of Spread–Spectrum Multiple–Access Channels," *IEEE Journal On Selected Areas In Communications*, vol. 8, No. 4, May 1990, pp. 641–649.

Simon et al., "3.5—Coded Direct–Sequence Spread Binary Phase–Shift–Keying," *Spread Spectrum Communications Handbook (Revised Edition)*, Pub. by McGraw–Hill, Inc., 1994, pp. 151–167.

*Primary Examiner*—Amanda T. Le
*Attorney, Agent, or Firm*—Staas & Halsey LLP

[57] ABSTRACT

A plurality of chips generated by spectrum spreading from each of the bits constituting transmission information are distributed along the time axis, and transmitted. At the receiving end, the transmission information is recovered while integrating information of the chips distributed along the time axis. In a first aspect of the present invention, the transmission information is repeated multiple times, and then the resulting information is spread by a spreading code to generate the transmission data. In a second aspect of the present invention, the transmission information is first spread by a spreading code and then interleaved to generate the transmission data.

16 Claims, 17 Drawing Sheets

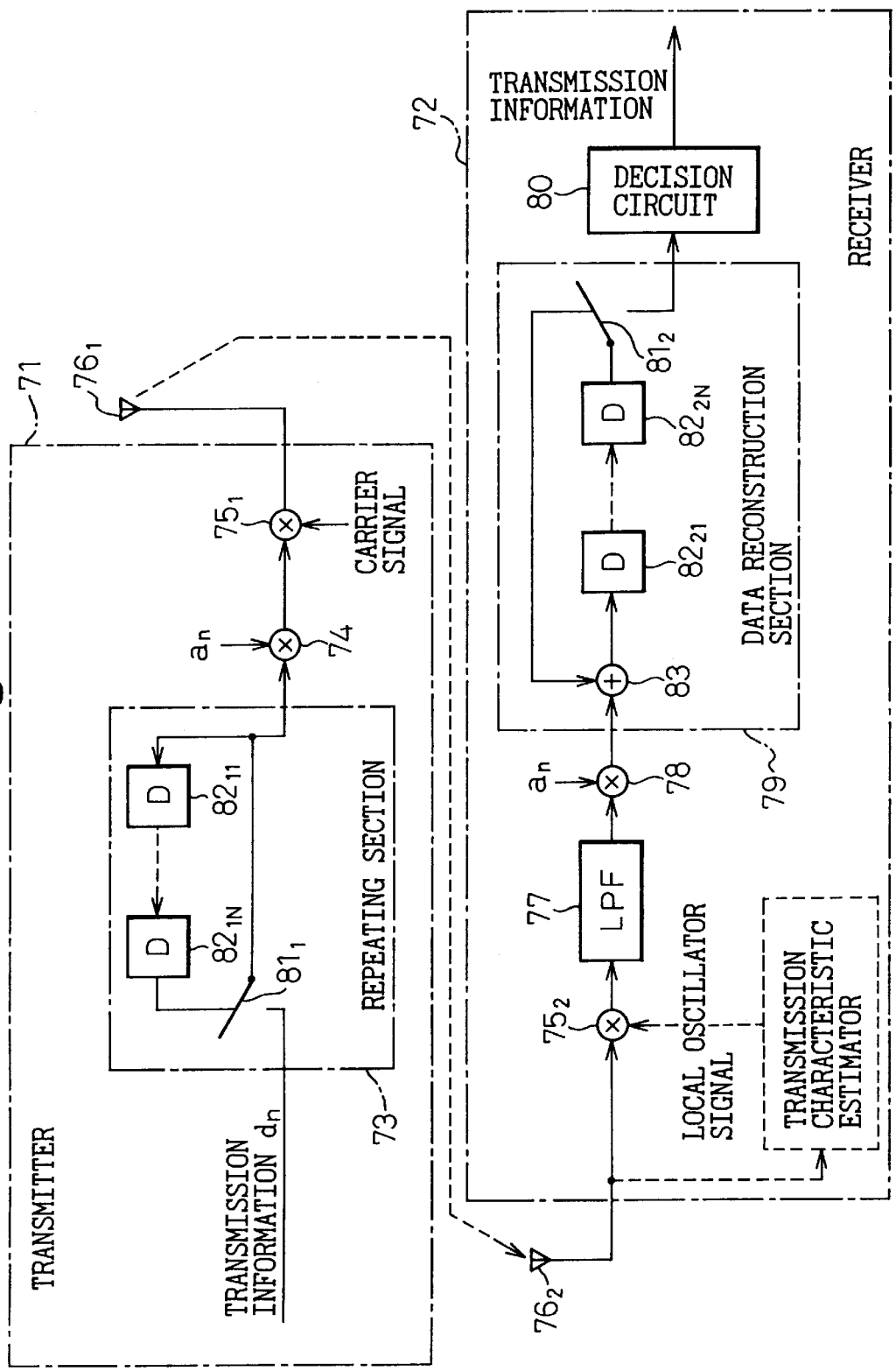

TRANSMISSION INFORMATION

FREQUENCY

REPEATING BIT SEQUENCE

FREQUENCY

TRANSMITTED WAVE

FREQUENCY

Fig.7

| SEQUENCE | SPREADING CODE |
|---|---|
| 1 | a0, a1, a2, a3, a4, a5, a6, a7, a8, ---- |
| 2 | -a0, a1, -a2, a3, -a4, a5, -a6, a7, -a8, ---- |
| 3 | a0, -a1, a2, -a3, a4, -a5, a6, -a7, a8, ---- |
| 4 | -a0, -a1, a2, a3, -a4, -a5, a6, a7, -a8, ---- |

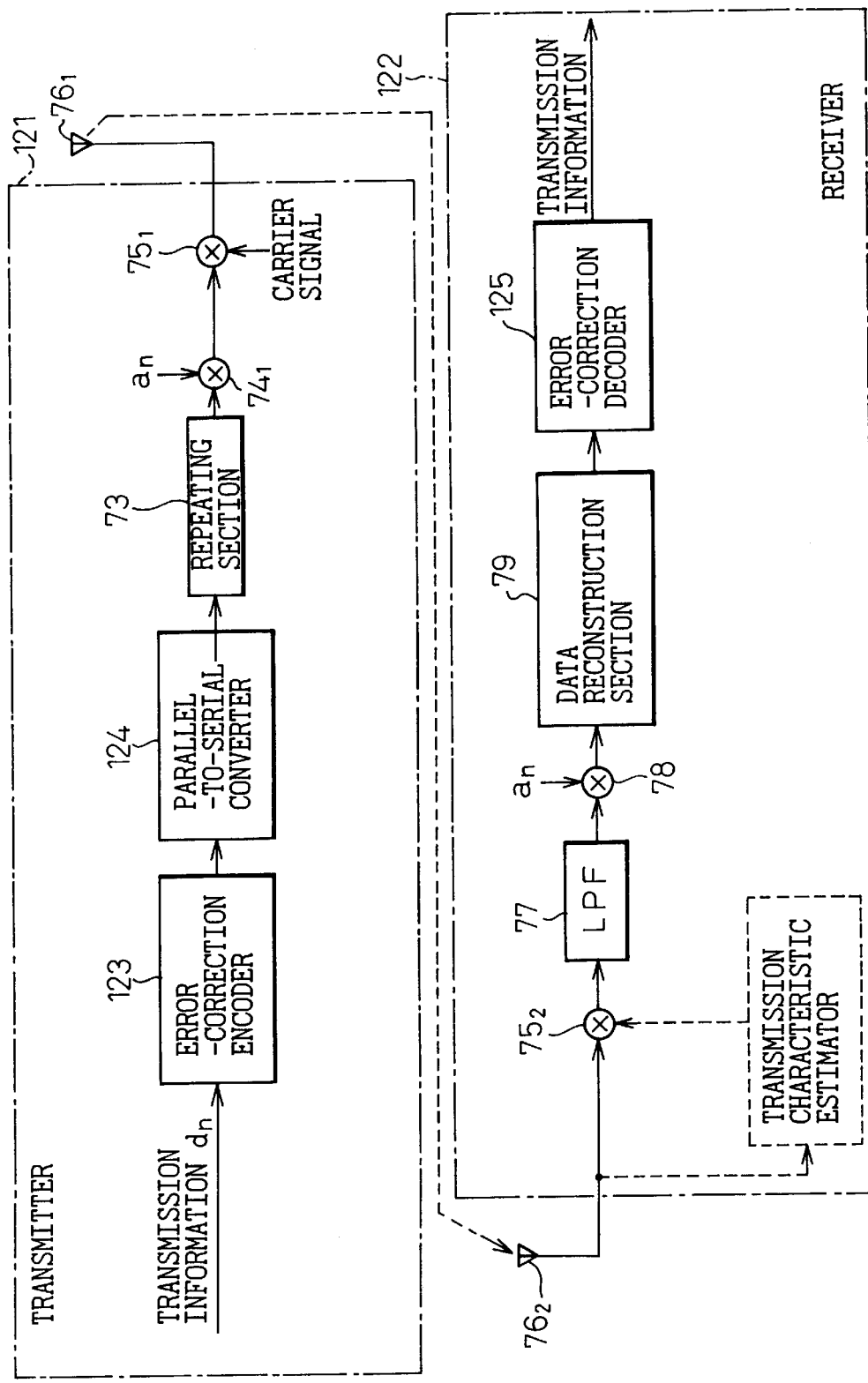

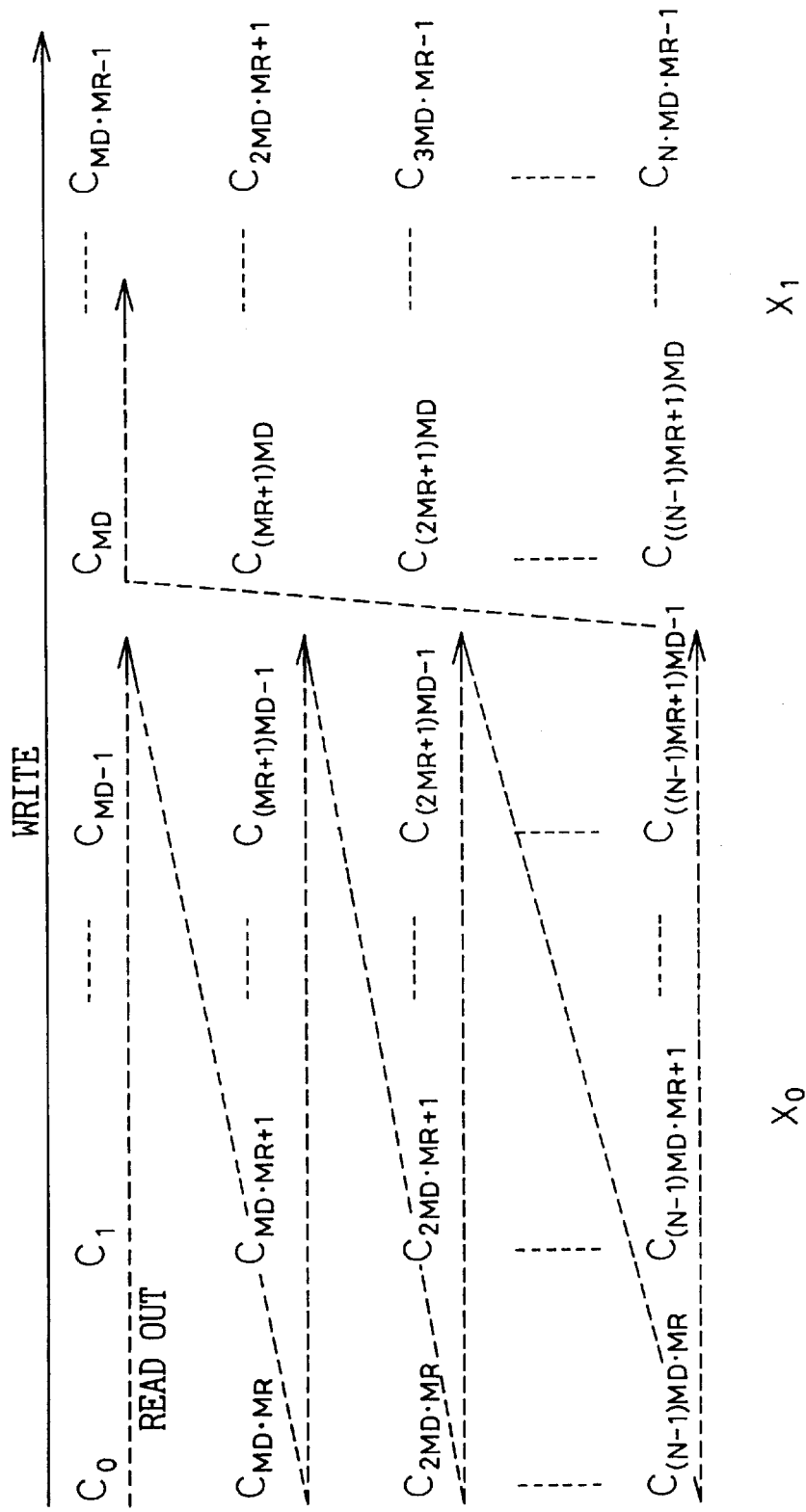

COMMUNICATIONS DEVICE EMPLOYING SPECTRUM SPREADING IN TRANSMITTED BITS ALONG A TIME AXIS

BACKGROUND OF THE INVENTION

1. Field of the Invention

The present invention relates to spread-spectrum communication in which a transmission signal is spread using a spreading code uniquely assigned to each terminal and is despread using an identical spreading code at the receiving end, thereby providing a plurality of communication channels using different spreading codes within the same frequency band.

2. Description of the Related Art

In recent years, portable terminals in mobile communication systems and personal computers and other data terminals have been spreading rapidly as cost reductions are made along with reductions in size. Against this backdrop, it is strongly demanded to provide communication services that enable large amounts and a large variety of information to be transmitted and received in outdoor situations and in mobile vehicles by linking these two systems. Research and work for commercialization of techniques required to implement such communication services have been proceeding, with effort directed toward utilizing the techniques employed in the currently commercialized analog and digital mobile communication systems as far as possible.

Of these techniques, selective diversity, equal-ratio combining, maximal-ratio combining, and other space diversity methods, for example, have already been used widely in practical applications as techniques for compensating for the transmission characteristics that greatly fluctuate with the movement of mobile units and because of reflections from terrestrial surfaces and terrestrial objects intervening in a radio transmission path and the attenuation resulting from such obstacles.

In space diversity methods, to obtain a sufficient effect of space diversity the correlation between received waves arriving at a plurality of branches (antennas) must be minimized, which requires that minimum required spacing be provided between these branches. This has served as a limiting factor in reducing hardware size at the receiving end, and often has precluded its practical application in portable-type terminals among others.

One approach to overcoming such constraints may be employing a system in which transmission information is first converted into parallel sequences and then combined for transmission after modulation with Hadamard sequences, as disclosed, for example, in Japanese Patent Unexamined Publication No. 7-274249. In this system, however, since the transmission signal is a multi-valued signal, high linearity is required of amplifiers and other hardware constituting the transmitter and receiver, which has placed limitations on the selection of circuits, mounting, etc. and often has precluded its practical application.

As techniques for achieving such compensation, spread-spectrum communication systems are known in which transmission information having a bit rate of several tens of kbps is spread over a bandwidth of several MHz to several tens of MHz and transmitted through a radio link, and the transmitted information is despread at the receiving end, thus making it possible to avoid the effects of delayed waves arriving with delays of several tens of nanoseconds to several microseconds.

However, in the prior known spread-spectrum communication systems, in applications that require achieving high-quality transmission by avoiding the effects of received waves having a small amount of delay such as Rayleigh fading, information to be transmitted has to be spread over a wider bandwidth (which means a greater bandwidth expansion factor); therefore, practical application has not been possible in many cases due to such limiting factors as a significant increase in power consumption and the limited number of assignable radio frequencies.

SUMMARY OF THE INVENTION

It is an object of the present invention to provide a novel spread-spectrum communication technique that achieves better performance than the prior known spread-spectrum communication techniques in compensating for fluctuations of transmission channel characteristics, without having to increase the expansion factor.

According to the present invention, there is provided a spread-spectrum communication method comprising the steps of: spreading a spectrum of transmission information in such a manner that a plurality of chips, generated by spectrum spreading from each of information elements constituting the transmission information, are scattered along a time axis according to a prescribed rule; transmitting the spread-spectrum transmission information; receiving the spread-spectrum transmission information; and recovering the transmission information from the received spread-spectrum transmission information while integrating information of the chips generated from each information element and scattered along the time axis.

According to the present invention, there is also provided a spread-spectrum communication system comprising: means for spreading a spectrum of transmission information in such a manner that a plurality of chips, generated by spectrum spreading from each of information elements constituting the transmission information, are scattered along a time axis according to a prescribed rule; means for transmitting the spread-spectrum transmission information; means for receiving the spread-spectrum transmission information; and means for recovering the transmission information from the received spread-spectrum transmission information while integrating information of the chips generated from each information element and scattered along the time axis.

According to the present invention, there is also provided a transmitter for spread-spectrum communication comprising: means for spreading a spectrum of transmission information in such a manner that a plurality of chips, generated by spectrum spreading from each of information elements constituting the transmission information, are scattered along a time axis according to a prescribed rule; and means for transmitting the spread-spectrum transmission information.

According to the present invention, there is also provided a receiver for spread-spectrum communication comprising: means for receiving transmission information whose spectrum is spread in such a manner that a plurality of chips, generated by spectrum spreading from each of information elements constituting the transmission information, are scattered along a time axis according to a prescribed rule; and means for recovering the transmission information from the received spread-spectrum transmission information while integrating information of the chips generated from each information element and scattered along the time axis.

BRIEF DESCRIPTION OF THE DRAWINGS

FIG. 1 is a block diagram of a spread-spectrum communication system according to one embodiment of the present invention;

FIG. 7 is a diagram showing one example of a spreading code used in the system of FIG. 6;

FIG. 10 is a block diagram of a spread-spectrum communication system according to a further embodiment of the present invention;

FIG. 17 is a diagram for explaining the operation of an interleaver 86a in FIG. 16.

DESCRIPTION OF THE PREFERRED EMBODIMENTS

Figure 2A:
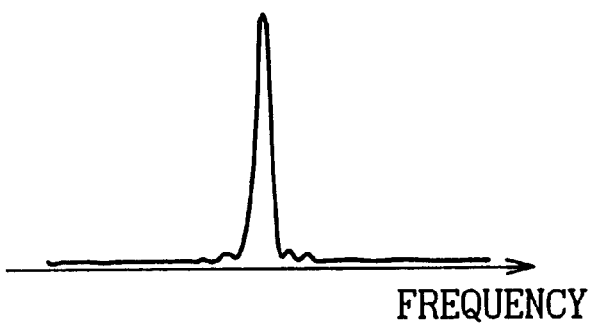
FIG. 2 is a frequency spectrum diagram for the system of FIG. 1.

FIG. 1 shows a spread-spectrum communication system according to one embodiment of the present invention.

In FIG. 1, a transmitter 71 and a receiver 72 are at opposite ends of a radio transmission link. At the transmitter 71, transmission information is supplied to a feed point of an antenna $76_1$ via a repeating section 73, a random-sequence modulator 74, and a frequency converter $75_1$. A spreading code an is applied to a code input of the random-sequence modulator 74, and a carrier signal is applied to a local oscillator input of the frequency converter $75_1$.

At the receiver 72, the signal received by an antenna $76_2$ is supplied to the input of a decision circuit 80 via a frequency converter $75_2$, a low-pass filter 77, a random-sequence demodulator 78, and a data reconstruction section 79, and the demodulated transmission information is obtained at the output of the decision circuit 80. A local oscillator signal synchronized to the above carrier signal is applied to a local oscillator input of the frequency converter $75_2$, while the spreading code $a_n$ is applied to a code input of the random-sequence demodulator 78.

In the repeating section 73, the transmission information $d_n$ is connected to one contact of a switch $81_1$ whose common contact is connected to the input of a delay element $82_{11}$ as well as to the input of the random-sequence modulator 74. The output of the delay element $82_{11}$ is coupled to the other contact of the switch $81_1$ via delay elements $82_{12}$ to $82_{1N}$ connected in series.

In the data reconstruction section 79, the output of the random-sequence demodulator 78 is connected to one input of an adder 83 whose output is coupled to a common contact of a switch $81_2$ via delay elements $82_{21}$ to $82_{2N}$ connected in series. One contact of the switch $81_2$ is connected to the other input of the adder 83, and the other contact of the switch $81_2$ is connected to the input of the decision circuit 80.

In the repeating section 73 provided in the transmitter 71, the delay elements $82_{11}$ to $82_{1N}$ are driven in synchronism with a clock that provides the same bit rate as the spreading code $a_n$ applied to the random-sequence modulator 74.

As shown by the following equation, the switch $81_1$ selects the transmission information $d_n$ for N successive clocks, thereby loading N units of transmission information $d_n$ into the delay elements $82_{11}$ to $82_{1N}$ while supplying the same as inputs to the random-sequence modulator 74, and then selects the output of the delay elements $82_{1N}$ for the next (M−1)N clocks, thereby repeating the same transmission information $d_n$ (M−1) times for supply to the random-sequence modulator 74.

$$S_n = \begin{bmatrix} d_n(n < N) \\ S_{n-N}(N \leq n < MN) \end{bmatrix}$$

By repeating this operation, during each interval of MN clocks a block $\{d_n\}$ consisting of N units of transmission information is loaded into the repeating section 73 intermittently, and a sequence $\{S_n\}$ consisting of M repeated blocks is continuously output from the repeating section 73.

The random-sequence modulator 74 outputs a signal sequence $\{C_n\}$ by multiplying the repeating bit sequence $S_n$ with the spreading code $a_n$ (here, for simplicity, a PN code) having the same rate as the repeating bit sequence $S_n$ (M times the rate of the transmission information), as shown by the equation $$C_n = S_n \cdot a_n$$

The frequency converter $75_1$ shifts this signal sequence $\{C_n\}$ to the desired frequency band along the frequency axis, for transmission via the antenna $76_1$.

At the receiver 72, the frequency converter $75_2$ shifts the received wave arriving at the antenna $76_2$ to the baseband region along the frequency axis. The random-sequence demodulator 78 loads therein the signal in that region (hereinafter called the baseband signal) via the low-pass filter 77, and multiplies it with the spreading code $a_n$ synchronized to the baseband signal by means of a synchronization control circuit (not shown), thereby generating a received repeating bit sequence $S_n'$ corresponding to the repeating bit sequence $S_n$ obtained at the output of the repeating section 73 at the transmitter 71.

The data reconstruction section 79 generates received blocks $\{d_n'\}$ corresponding to the original blocks $\{d_n\}$ by processing the received repeating bit sequence $S_n'$ by reversing the process performed in the repeating section 73 at the transmitter 71, that is, by delaying the sequence through the delay elements $82_{21}$ to $82_{2N}$ by N clocks and adding up the same M times. With the decision circuit 80 performing signal decisions on the thus generated received blocks {$d_n'$}, the original transmission information is sequentially reconstructed.

In this way, according to the present invention, the transmission information, each of whose constituent elements (bits) is divided into a plurality of units and distributed at prescribed intervals along the time axis, is hidden in the signal processed by spectrum spreading at the transmitting end, and at the receiving end, after despreading, each information element is added up to recover the transmission information. Time diversity is thus achieved. Accordingly, compared with the prior known spread-spectrum communication systems wherein each information element is transmitted in a hidden form as one block, the degradation of transmission quality caused by fluctuations of radio channel transmission characteristics is alleviated by virtue of time diversity. Hereinafter, the communication system of the present invention will be referred to as the repetitive spread-spectrum (RSS) system.

Figure 2B:
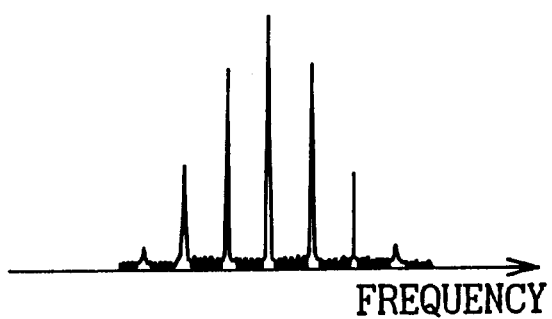
Figure 2C:
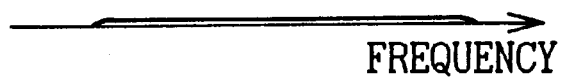

In the present embodiment, the transmission wave to be transmitted from the transmitter 71 is first spread over a plurality of spectra by the above-described repetitive coding, as shown in parts (a) and (b) of FIG. 2, but by applying a spreading code, i.e., by multiplying it with the spreading code an synchronized to the repetition, the transmitted wave occupies the same bandwidth as the prior known spread-spectrum communication, as shown in part (c) of FIG. 2.

Figure 3:
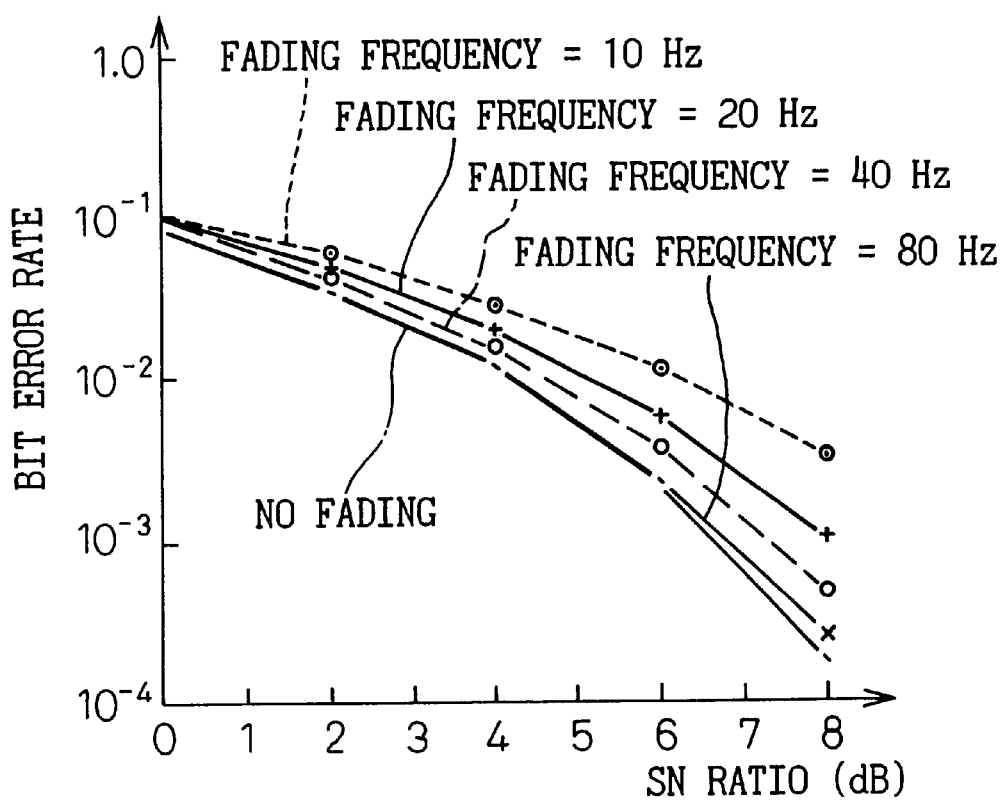
FIG. 3 is a graph showing transmission quality for the system of FIG. 1.

As for the bit error rate (transmission quality) obtained by the present embodiment, when a 512-bit frame structure consisting of a 480 bit block {$d_n$} and 32 redundant bits appended to the block is employed, and when the frame period is 0.2 second and the maximum Doppler frequency is in the range of 40 to 80 Hz, approximately the same value is obtained between a transmission channel involving fading and a transmission channel not involving such fading, as shown in FIG. 3.

Figure 4:
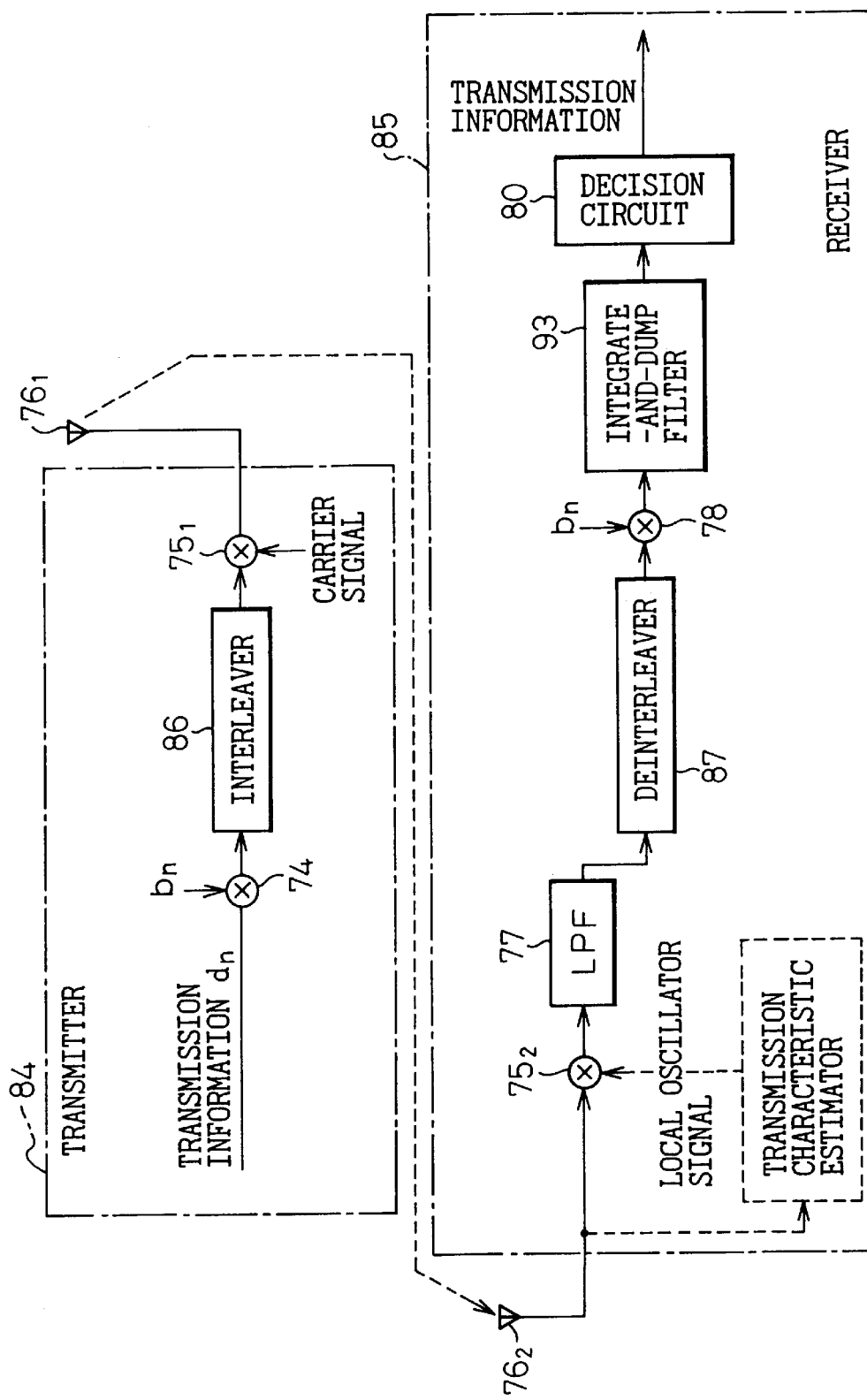
FIG. 4 is a block diagram of a spread-spectrum communication system according to another embodiment of the present invention.

FIG. 4 is a diagram showing another embodiment of the present invention.

In FIG. 4, the parts identical in configuration to those shown in FIG. 1 are designated by the same reference numerals, and descriptions of such parts will not be repeated here.

The difference in configuration between the present embodiment and the embodiment shown in FIG. 1 lies in a transmitter 84 provided in place of the transmitter 71 and a receiver 85 provided in place of the receiver 72.

In the transmitter 84, an interleaver 86 which replaces the repeating section 73 is located between the random-sequence modulator 74 and the frequency converter 75$_1$, and the code input of the random-sequence modulator 74 is supplied with a code $b_n$ instead of the spreading code $a_n$.

In the receiver 85, a deinterleaver 87 which replaces the data reconstruction section 79 is located between the low-pass filter (LPF) 77 and the random-sequence demodulator 78, and the code input of the random-sequence demodulator 78 is supplied with the code $b_n$. Furthermore, an integrate-and-dump filter 93, which adds up successive M samples for output, thereby taking an average over the M samples and thus setting the sampling rate to 1/M, is provided between the random-sequence demodulator 78 and the decision circuit 80.

At the transmitter 84, the random-sequence modulator 74 generates baseband signals $C_n$(n=0 to (MN−1)) from the transmission information $d_n$(n=0 to N−1) by performing the operation expressed by the following equation on the transmission information $d_n$ and the spreading code $b_n$ having a rate M times that of the transmission information.

$$C_n = b_n \cdot d_n$$

As noted above, since the rate of the spreading code $b_n$ is M times that of the transmission information $d_n$, a block with a rate M times as fast and a length of MN is generated from the transmission information of length N.

Figure 5:
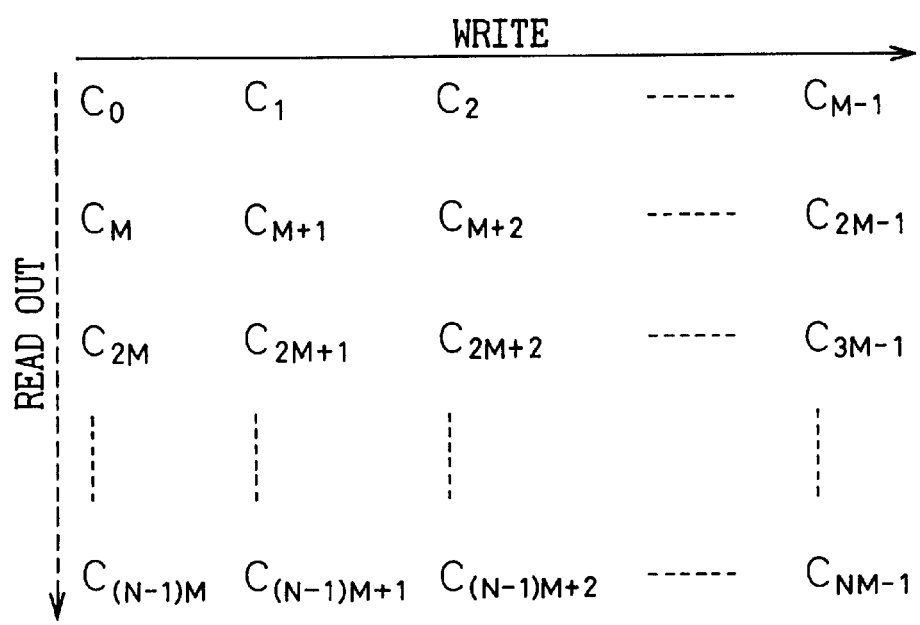
FIG. 5 is a diagram for explaining the operation of an interleaver 86 in FIG. 4.

The interleaver 86 repeatedly stores these baseband signals $C_n$ in a matrix of N rows and M columns on a row-by-row basis in the order of ascending column numbers, as indicated by the solid line in FIG. 5, and reads out the matrix column-wise in the order of ascending row numbers, as shown by the dotted line, thereby introducing redundancy in the baseband signals and distributing them over a plurality of timings.

On the other hand, at the receiver 85, the deinterleaver 87 reverses the above-described processing performed by the interleaver 86, and the random-sequence demodulator 78 performs decoding, which is the reverse of the processing performed by the random-sequence modulator 74, based on the spreading code $b_n$ likewise applied in synchronism with the received wave. The integrate-and-dump filter 93 adds up the M successive samples and averages them, thereby achieving time diversity.

It should be noted here that when the result of interleaving the spreading code $b_n$ in the interleaver 86 is equal to the spreading code $a_n$ in FIG. 1, for the same transmission information the transmitter 84 in FIG. 4 produces the same output as the transmitter 71 in FIG. 1. Accordingly, the system of the embodiment shown in FIG. 4 also has advantages equivalent to those achieved by the system of FIG. 1.

Figure 6:
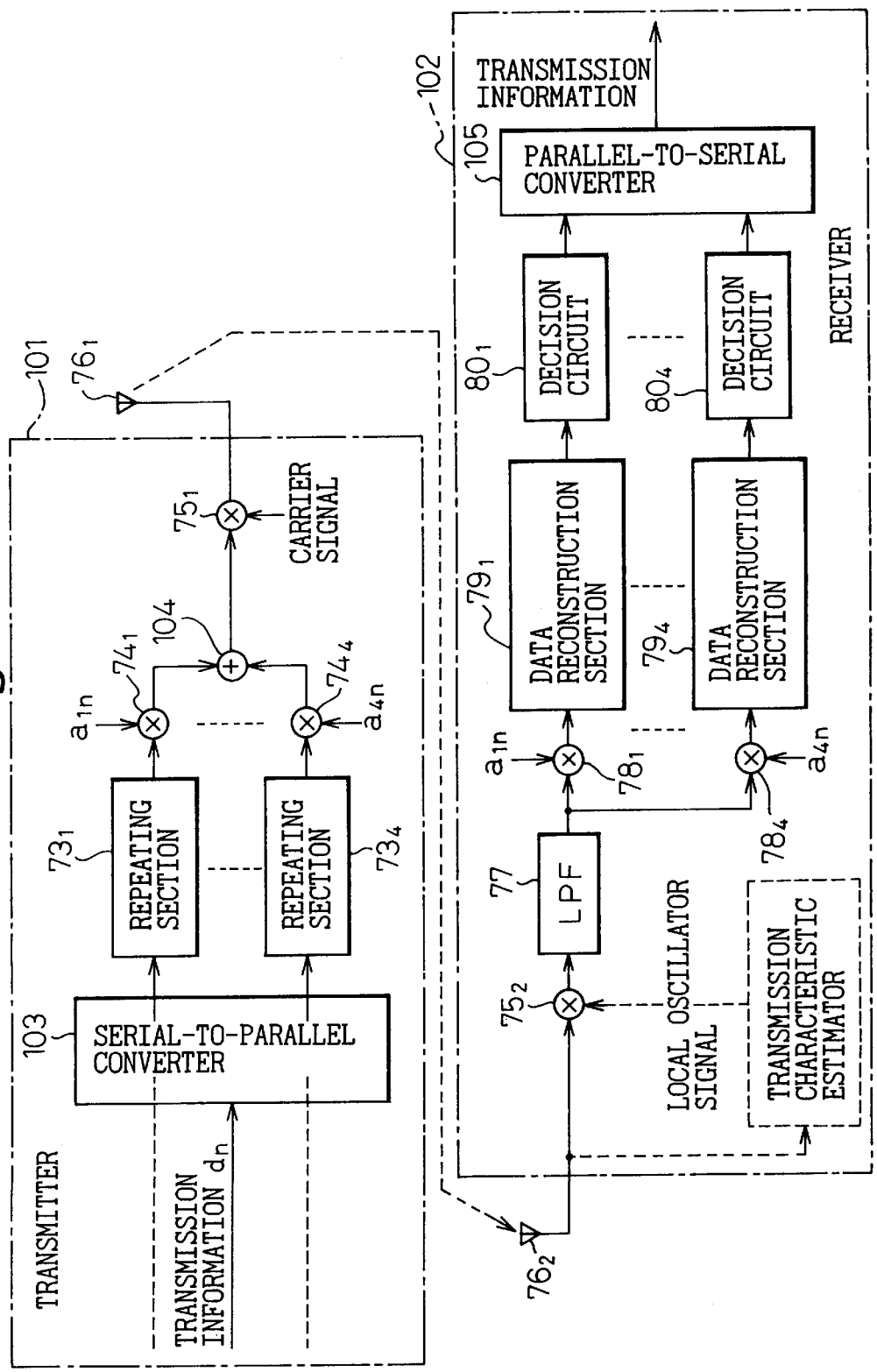
FIG. 6 is a block diagram of a spread-spectrum communication system according to still another embodiment of the present invention.

FIG. 6 is a diagram showing still another embodiment of the present invention. In FIG. 6, the parts identical in configuration to those shown in FIG. 1 are designated by the same reference numerals, and descriptions of such parts will not be repeated here.

The difference in configuration between the present embodiment and the embodiment shown in FIG. 1 lies in a transmitter 101 provided in place of the transmitter 71 and a receiver 102 provided in place of the receiver 72.

The transmitter 101 differs in configuration from the transmitter 71 in that the random-sequence modulator 74 is replaced by random-sequence modulators 74$_1$ to 74$_4$ whose code inputs are supplied with mutually different spreading codes $a_{1n}$ to $a_{4n}$, the random-sequence modulators 74$_1$ to 74$_4$ being preceded by repeating sections 73$_1$ to 73$_4$, respectively, which are provided in place of the repeating section 73 and which perform the same operation as the repeating section 73, and further in that a serial-to-parallel converter 103 having outputs corresponding to the respective repeating sections 73$_1$ to 73$_4$ is provided before the repeating sections 73$_1$ to 73$_4$, while the outputs of the random-sequence modulators 74$_1$ to 74$_4$ are connected to an input of the frequency converter 75$_1$ through a common adder 104. The signals output from the repeating sections 73$_1$ to 73$_4$ have a rate 1/M$_D$ times that of the spreading codes $a_{1n}$ to $a_{4n}$.

The receiver 102 differs in configuration from the receiver 72 in that the random-sequence demodulator 78 is replaced by random-sequence demodulators 78$_1$ to 78$_4$ whose input terminals are connected in parallel and whose outputs are respectively connected to the inputs of data reconstruction sections 79$_1$ to 79$_4$ provided in place of the data reconstruction section 79, and further in that the outputs of the data reconstruction sections 79$_1$ to 79$_4$ are respectively connected to the inputs of decision circuits 80$_1$ to 80$_4$ provided in place of the decision circuit 80, the decision circuits 80$_1$ to 80$_4$ being followed by a parallel-to-serial converter 105 having input terminals respectively corresponding the decision circuits $80_1$ to $80_4$.

At the transmitter 101, when the Doppler shift occurring along the transmission channel is sufficiently smaller than one fourth of the spread bandwidth, orthogonality can be achieved by setting the value of the integer $M_D$ to 4, that is, by setting the rate of the spreading codes $a_{1n}$ to $a_{4n}$ to four times that of the signals output from the repeating sections $73_1$ to $73_4$. The spreading codes $a_{1n}$ to $a_{4n}$ applied to the random-sequence modulators $74_1$ to $74_4$ are given as mutually orthogonal four sequences (a0, a1, a2, a3, a4, a5, a6, a7, a8, ...), (-a0, a1, -a2, a3, -a4, a5, -a6, a7, -a8, ...), (a0, -a1, a2, -a3, a4, -a5, a6, -a7, a8, ...), and (-a0, -a1, a2, a3, -a4, -a5, a6, a7, -a8, ...), respectively, as shown in FIG. 7.

The serial-to-parallel converter 103 takes in the transmission information $d_n$, and by serial-to-parallel conversion, divides the transmission information into four portions and supplies them in parallel fashion to the repeating sections $73_1$ to $73_4$. With the combination of the repeating sections $73_1$ to $73_4$ and random-sequence modulators $74_1$ to $74_4$, four different channels are formed based on the mutually orthogonal sequences stated above, and the baseband signals obtained at the outputs of the random-sequence modulators $74_1$ to $74_4$ are added together in the adder 104 and supplied to the frequency converter $75_1$. As a consequence, four mutually orthogonal radio channels sharing the same radio bandwidth are formed along the radio transmission path formed between the antennas $76_1$ and $76_2$, and the four portions of the transmission information are transmitted along the respective radio channels.

At the receiver 102, on the other hand, the combination of the random-sequence demodulators $78_1$ to $78_4$, data reconstruction sections $79_1$ to $79_4$, and decision circuits $80_1$ to $80_4$ performs the same processing as performed by the combination of the random-sequence demodulator 78, data reconstruction section 79, and decision circuit 80 shown in FIG. 1, in a parallel fashion on the received waves obtained via the four mutually orthogonal radio channels. Further, in the parallel-to-serial converter 105, the processing performed by the serial-to-parallel converter 103 in the transmitter 101 is reversed to process the four bit sequences obtained in parallel at the outputs of the decision circuits $80_1$ to $80_4$ as a result of the preceding processing, and the transmission information $d_n$ is thus recovered.

In this way, according to the present embodiment, the spread-spectrum communication system of the embodiment shown in FIG. 1, which is suitable for application to radio transmission channels whose transmission characteristics can fluctuate greatly, is modified to form a plurality of orthogonal transmission channels.

The above embodiment has assumed a single information source as the source of the transmission information $d_n$, but in applications where the information to be transmitted along the mutually orthogonal transmission channels is supplied in parallel from different information sources, for example, the transmitter 101 and the receiver 102 may be constructed by omitting the serial-to-parallel converter 103 and the parallel-to-serial converter 105, respectively, as shown by dotted lines in FIG. 6.

Furthermore, the receiver 102 need not necessarily have the random-sequence demodulator, data reconstruction section, and decision circuit for every transmitted signal, but could be configured to reconstruct information from only a particular information source by using the random-sequence demodulators, data reconstruction sections, and decision circuits.

Figure 8:
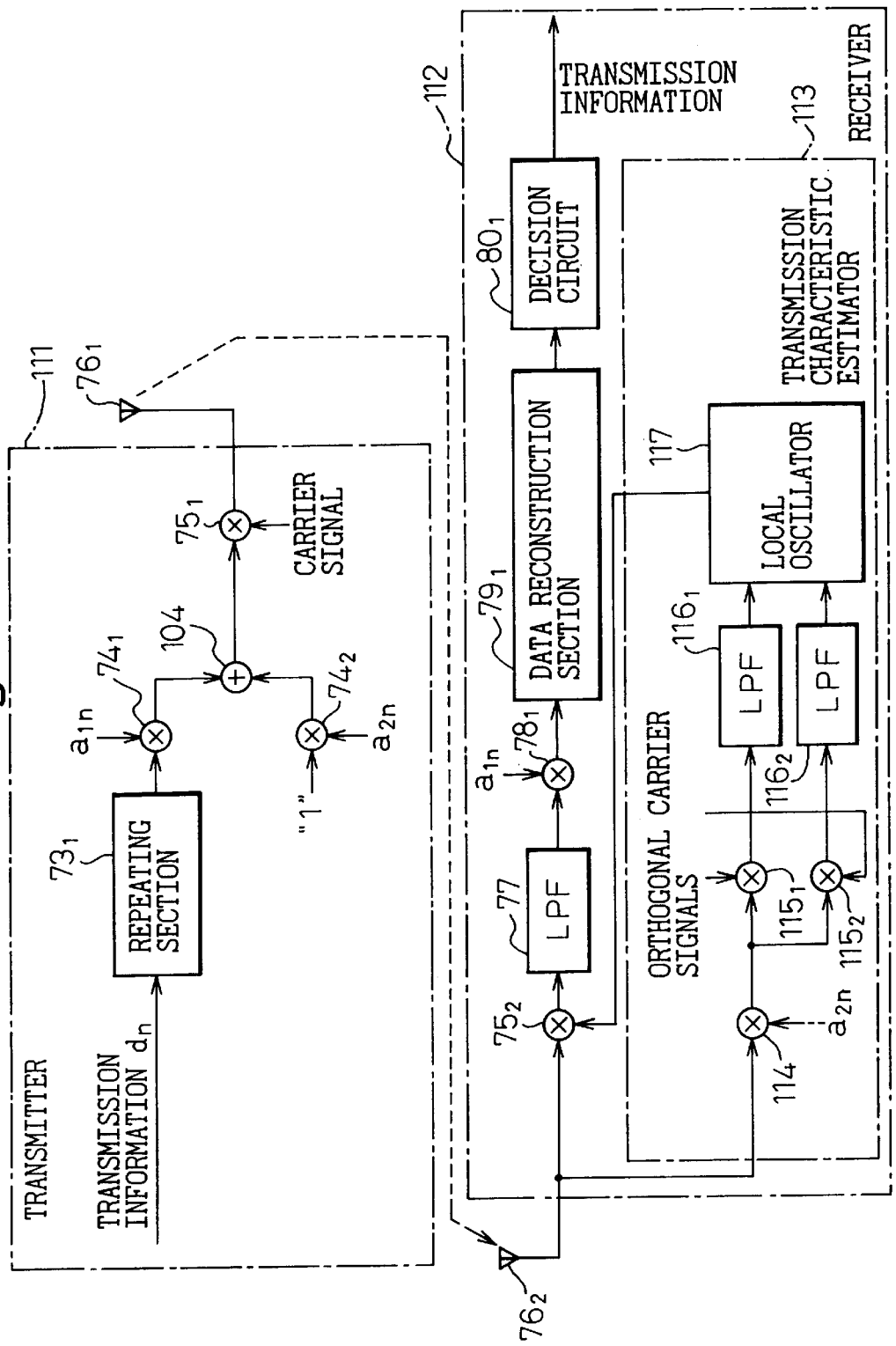
FIG. 8 is a block diagram of a spread-spectrum communication system according to a further embodiment of the present invention.

FIG. 8 is a diagram showing a further embodiment of the present invention. In FIG. 8, the parts identical in configuration to those shown in FIG. 6 are designated by the same reference numerals, and descriptions of such parts will not be repeated here.

The difference in configuration between the present embodiment and the embodiment shown in FIG. 6 lies in a transmitter 111 provided in place of the transmitter 101 and a receiver 112 provided in place of the receiver 102.

The transmitter 111 differs in configuration from the transmitter 101 in that the repeating sections $73_2$ to $73_4$, the random-sequence modulators $74_3$ and $74_4$, and the serial-to-parallel converter 103 are omitted, and in that the random-sequence modulator $74_2$ is supplied at an input thereof with a known bit sequence (for simplicity, it is assumed here that all bits take on a fixed logic value "1").

The receiver 112 differs in configuration from the receiver 102 in that the random-sequence demodulators $78_2$ to $78_4$, the data reconstruction sections $79_2$ to $79_4$, the decision circuits $80_2$ to $80_4$, and the parallel-to-serial converter 104 are omitted, and in that a transmission characteristic estimator 113 is provided between the feed point of the antenna $76_2$ and the local oscillator input of the frequency converter $75_2$.

In the transmission characteristic estimator 113, the feed point of the antenna $76_2$ is connected to an input of a random-sequence demodulator 114 whose code input is supplied with the spreading code $a_{2n}$ which is identical to the spreading code applied to the code input of the random-sequence modulator $74_2$ in the transmitter 111. The output of the random-sequence demodulator 114 is connected to one input of each of multipliers $115_1$ and $115_2$, and orthogonal carrier signals which are orthogonal to each other and are synchronized to the received waves arriving at the antenna $76_2$ are applied to the other inputs of the multipliers $115_1$ and $115_2$, respectively. The outputs of the multipliers $115_1$ and $115_2$ are coupled to the corresponding inputs of a local oscillator 117 via low-pass filters (LPF) $116_1$ and $116_2$, respectively, while the output of the local oscillator 117 is connected to the local oscillator input of the frequency converter $75_2$.

In the present embodiment, similarly to the embodiment shown in FIG. 6, two mutually orthogonal radio channels, one corresponding to the combination of the random-sequence modulator $74_1$ and random-sequence demodulator $78_1$ and the other corresponding to the random-sequence modulator $74_2$ and random-sequence demodulator 114, are formed in parallel fashion between the antennas $76_1$ and $76_2$; of these radio channels, the radio channel corresponding to the random-sequence modulator $74_2$ carries the bit sequence of all logic 1s as transmission information (pilot signal). Hereinafter, the radio channel used for transmission of this transmission information will be referred to as the pilot channel.

At the receiver 112, the random-sequence demodulator 114 extracts the pilot signal received via the pilot channel (hereinafter referred to as the received pilot signal) by multiplying together the received waves arriving at the antenna $76_2$ and the spreading code corresponding to the pilot channel. The multipliers $115_1$ and $115_2$ respectively multiply the pilot signal by the orthogonal carrier signals synchronized to the received waves, to obtain the orthogonal components of the received waves propagated through the radio transmission channel formed between the antennas $76_1$ and $76_2$. The local oscillator 117 accepts these orthogonal components at its inputs via the low-pass filters $116_1$ and $116_2$ and converts them into polar coordinates to obtain the amount of attenuation and the amount of phase shift that have occurred along the radio transmission path, based on which the phase of the carrier signal to be applied to the local oscillator input of the frequency converter 75$_2$ is corrected for the amount of phase shift of the radio transmission path, and the level is corrected in such a manner as to increase the weight as the amount of attenuation of the radio transmission path decreases.

Figure 9:
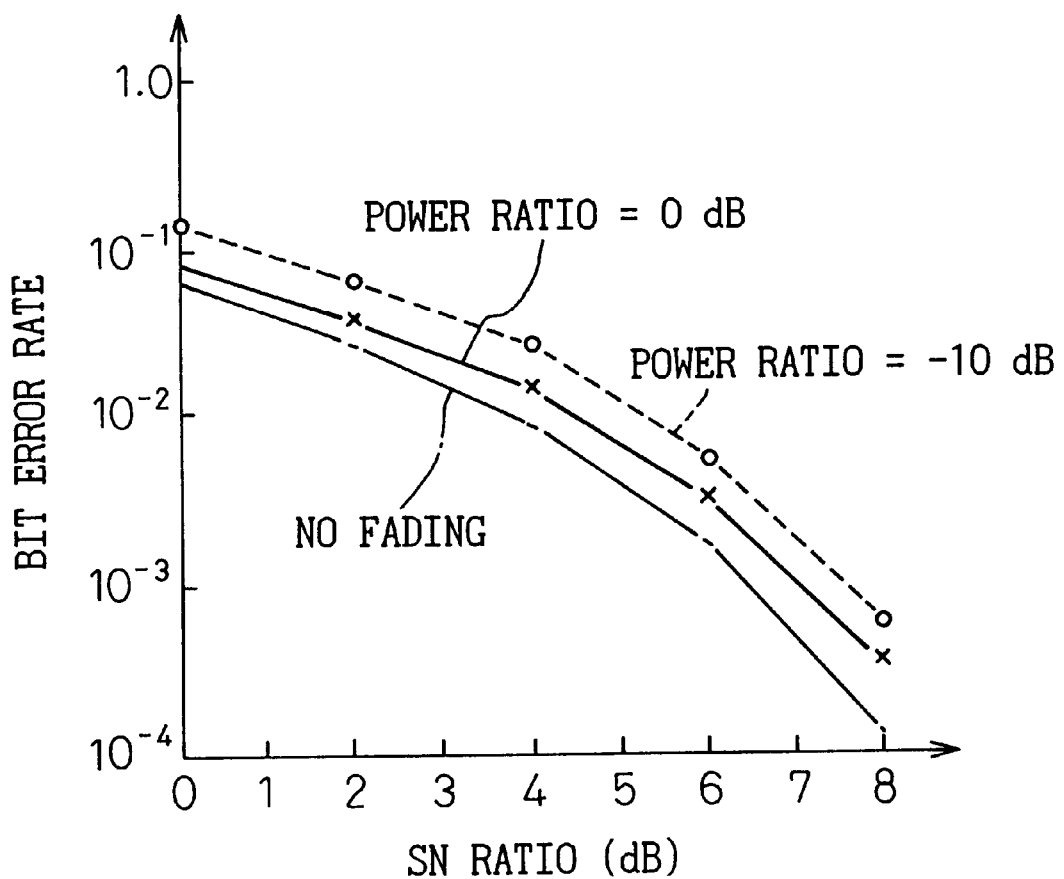
FIG. 9 is a graph showing transmission quality for the system of FIG. 8.

In this way, according to the present embodiment, fluctuations of the radio channel transmission characteristics are constantly compensated for, and high transmission quality is maintained whether the power ratio in the channels used for transmission of the pilot channel and transmission information is at 0 dB or at −10 dB, for example, as shown in FIG. 9. The curves shown in FIG. 9 represent the results of a computer simulation conducted under the conditions of an expansion factor of 32, transmission information word length of 480 bits, and block period of 200 ms.

In the present embodiment, no mention has been made of the passband characteristics of the low-pass filters 116$_1$ and 116$_2$, but they are only required to have a narrow pass band just enough to transmit the range of fluctuations occurring in the received waves due to actual fading along the radio transmission channels.

FIG. 10 is a diagram showing a further embodiment of the present invention. In FIG. 10, the parts identical in configuration to those shown in FIG. 1 are designated by the same reference numerals, and descriptions of such parts will not be repeated here.

The difference in configuration between the present embodiment and the embodiment shown in FIG. 1 lies in a transmitter 121 provided in place of the transmitter 71 and a receiver 122 provided in place of the receiver 72.

The transmitter 121 differs in configuration from the transmitter 71 in that an error-correction encoder 123 and a parallel-to-serial converter 124, connected in series, are provided before the repeating section 73.

The receiver 122 differs in configuration from the receiver 72 in that the decision circuit 80 is replaced by an error-correction decoder 125.

At the transmitter 121, the error-correction encoder 123 encodes the transmission information by using an error-correcting code usually employed for channel coding, prior to the modulation performed based on the RSS method. An error-correcting code of any type may be used as long as it matches the transmission characteristics and transmission rate of the radio transmission channel used, but for simplicity, the present embodiment assumes the use of a convolutional code with a code rate of ½, constraint length of 8, and generating polynomial of (247,371).

On the other hand, at the receiver 122, by using a Viterbi decoding algorithm and a soft decision method the error-correction decoder 125 decodes the bit sequence (received encoded sequence) supplied from the data reconstruction section 79.

Of the components constituting the transmitter 121 and receiver 122, the operation of components other than the error-correction encoder 123, parallel-to-serial converter 124, and error-correction decoder 125 is the same as the operation of the corresponding components described in the embodiment of FIG. 1, and therefore, their operational description will not be repeated here.

Figure 11A:
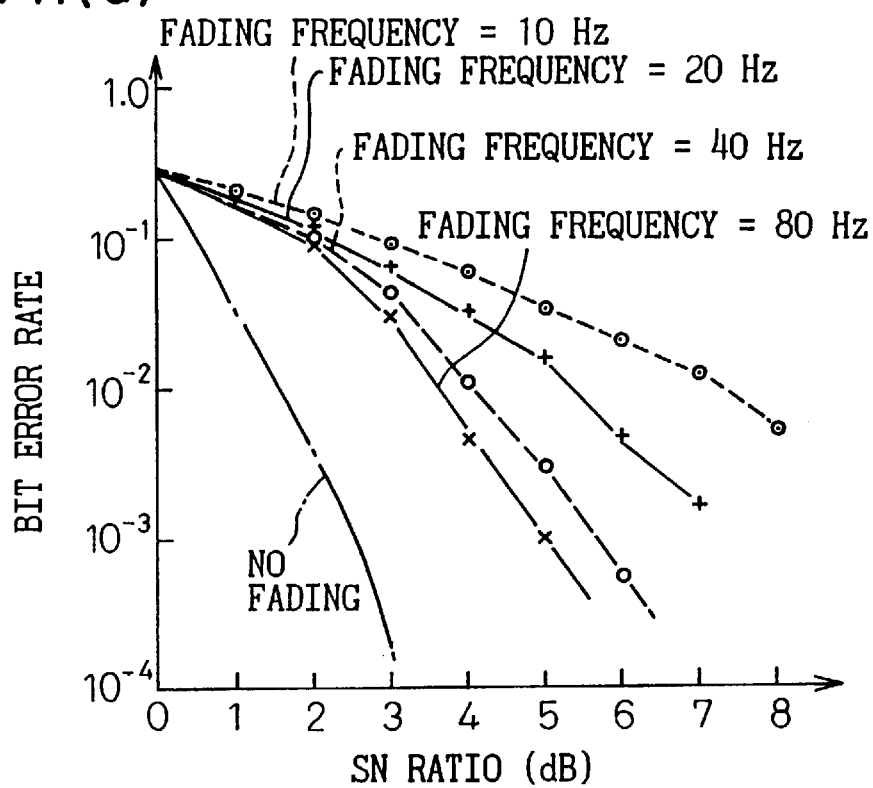
FIG. 11 is a graph showing transmission quality for the system of FIG. 10.
Figure 11B:
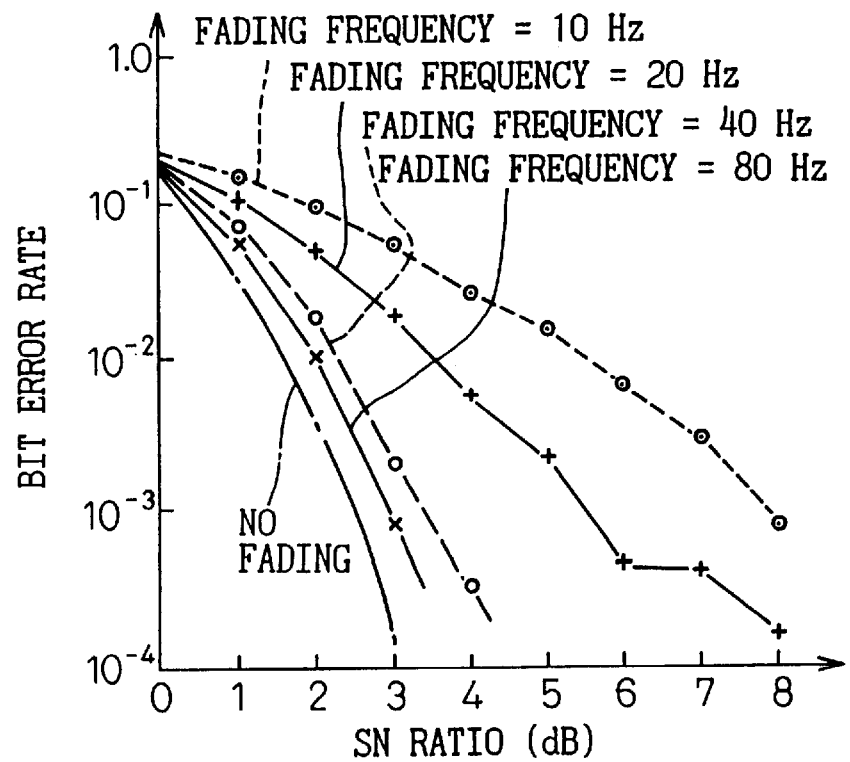

In this way, according to the present embodiment, since redundancy is introduced into the transmission information by error-correction coding prior to the modulation performed based on the RSS method, transmission quality can be improved without increasing the expansion factor, as shown in FIG. 11(b), compared, for example, to the transmission quality (FIG. 11(a)) obtained with the embodiment of FIG. 4 where 32×32 interleaving is applied and direct spreading coding is performed with an expansion factor of 32. This makes it possible to flexibly adjust the tradeoffs between the required transmission quality and the radio transmission channel utilization.

Figure 12:
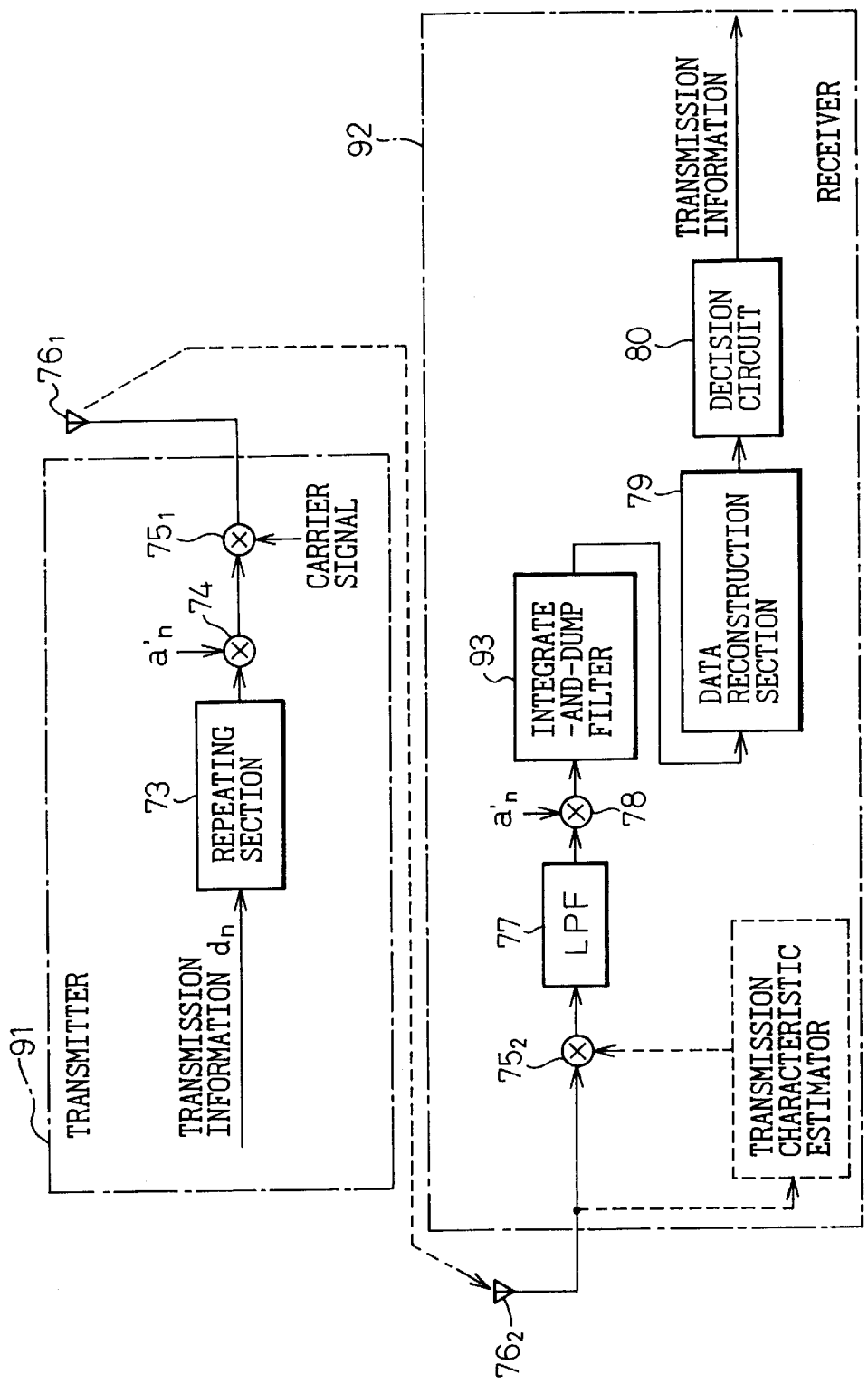
FIG. 12 is a block diagram of a spread-spectrum communication system according to a further embodiment of the present invention.

FIG. 12 is a diagram showing a further embodiment of the present invention. In FIG. 12, the parts identical in configuration to those shown in FIG. 1 are designated by the same reference numerals, and descriptions of such parts will not be repeated here.

The difference in configuration between the present embodiment and the embodiment shown in FIG. 1 lies in a transmitter 91 provided in place of the transmitter 71 and a receiver 92 provided in place of the receiver 72.

The configuration of the transmitter 91 is the same as that of the transmitter 71, except that the code input of the random-sequence modulator 74 is supplied with a spreading code $a_n'$ whose rate is not equal to the output rate of the repeating section 73 but is $M_D$ times that rate, where $M_D$ is a predetermined integer. Accordingly, if the same bandwidth as that of the embodiment of FIG. 1 is to be occupied, the number of repetitions, $M_R$, must be set to $1/M_D$, which means that the expansion factor M is the product of $M_D$ and $M_R$.

The configuration of the receiver 92 is the same as that of the receiver 72, except that an integrate-and-dump filter 93 for adding up and averaging $M_D$ successive samples is provided between the random-sequence demodulator 78 and the data reconstruction section 79, and that the code input of the random-sequence demodulator 78 is supplied with the spreading code $a_n'$.

The operation of the data reconstruction section 79 and decision circuit 80 is the same as that described in the embodiment of FIG. 1, and therefore, their operational description will not be repeated here.

In the present embodiment, since the expansion factor M is the product of the number of repetitions, $M_R$, and $M_D$, it is possible to construct a system close to the traditional direct spread-spectrum system by reducing the number of repetitions, $M_R$, and increasing $M_D$; it is also possible to construct the entire system as an RSS system by setting $M_D=1$. In other words, a flexible system can be constructed without having to change the frequency bandwidth used.

Figure 13:
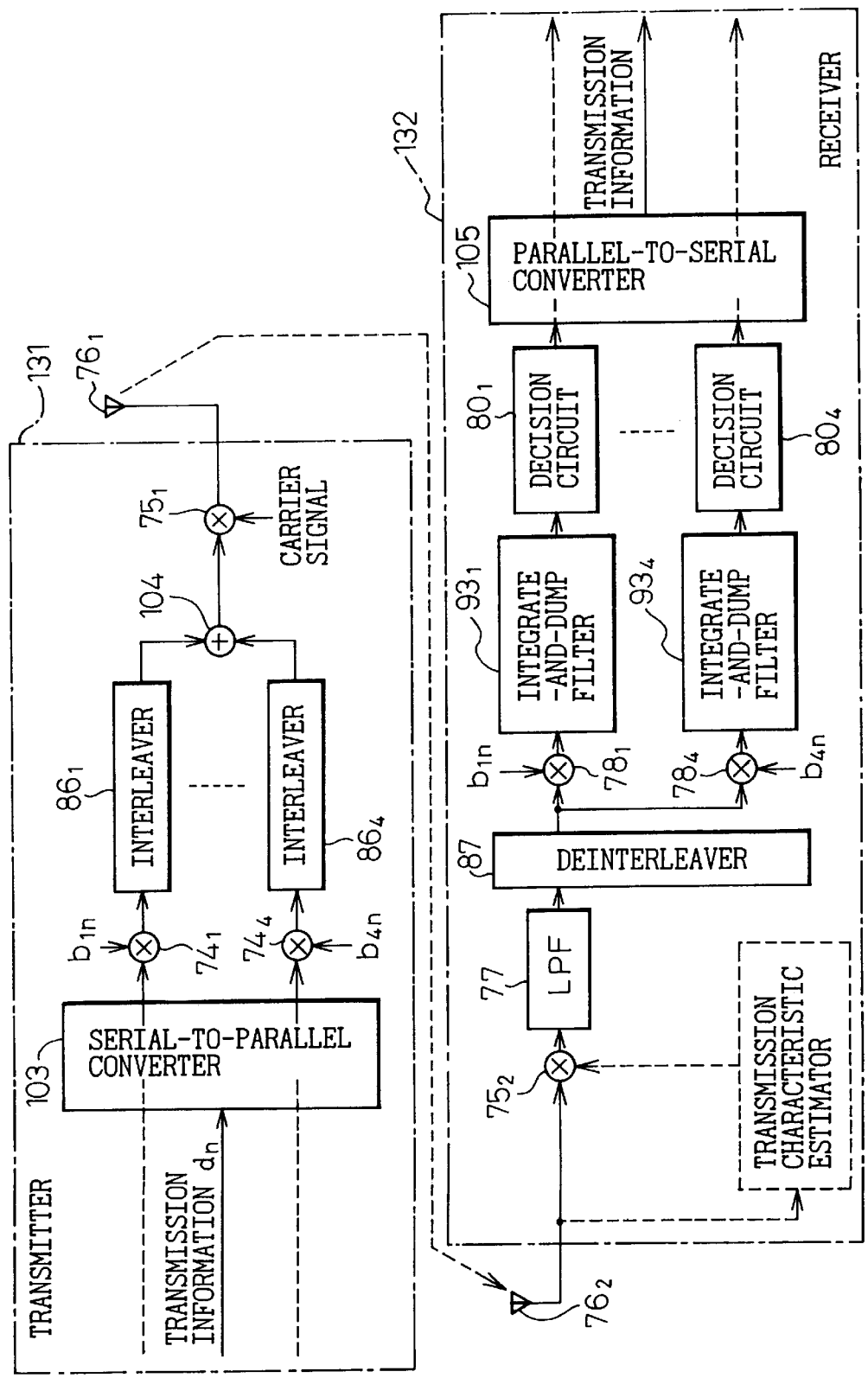
FIG. 13 is a block diagram of a spread-spectrum communication system according to a further embodiment of the present invention.

FIG. 13 is a diagram showing a further embodiment of the present invention. In FIG. 13, the parts identical in configuration to those shown in FIG. 4 are designated by the same reference numerals, and descriptions of such parts will not be repeated here.

The difference in configuration between the present embodiment and the embodiment shown in FIG. 4 lies in a transmitter 131 provided in place of the transmitter 84 and a receiver 132 provided in place of the receiver 85.

The transmitter 131 differs in configuration from the transmitter 84 in that the random-sequence modulator 74 is replaced by random-sequence modulators 74$_1$ to 74$_4$, whose code inputs are supplied with mutually different spreading codes $b_{1n}$ to $b_{4n}$, respectively, and which are respectively followed by interleavers 86$_1$ to 86$_4$ provided in place of the interleaver 86 and are preceded by a serial-to-parallel converter 103 having output terminals respectively corresponding to the random-sequence modulators 74$_1$ to 74$_4$, the outputs of the interleavers 86$_1$ to 86$_4$ being coupled to the input of the frequency converter 75$_1$ via a common adder 104.

The receiver 132 differs in configuration from the receiver 85 in that the random-sequence demodulator 78 is replaced by random-sequence demodulators $78_1$ to $78_4$, whose input terminals are connected in parallel, and whose outputs are respectively coupled to the inputs of integrate-and-dump filters $93_1$ to $93_4$ which are provided in place of the integrate-and-dump filter 93 and the outputs of which are respectively coupled to the inputs of decision circuits $80_1$ to $80_4$ provided in place of the decision circuit 80, the decision circuits $80_1$ to $80_4$ being followed by a parallel-to-serial converter 105 having input terminals respectively corresponding thereto.

At the transmitter 101, when the doppler shift occurring along the transmission channel is sufficiently smaller than one fourth of the spread bandwidth, four mutually orthogonal codes can be generated by setting the value of the integer $M_D$ to 4. The spreading codes $b_{1n}$ to $b_{4n}$ applied to the random-sequence modulators $74_1$ to $74_4$ are given as four mutually orthogonal sequences (b0, b1, b2, b3, b4, b5, b6, b7, b8, . . . ), (−b0, b1, −b2, b3, −b4, b5, −b6, b7, −b8, . . . ), (b0, −b1, b2, −b3, b4, −b5, b6, −b7, b8, . . . ), and (−b0, −b1, b2, b3, −b4, −b5, b6, b7, −b8, . . . ), respectively, similarly to the embodiment shown in FIG. 6.

The serial-to-parallel converter 103 takes in the transmission information $d_n$, and by serial-to-parallel conversion, divides the transmission information into four portions and supplies them in parallel fashion to the random-sequence modulators $74_1$ to $74_4$. With the combination of the random-sequence modulators $74_1$ to $74_4$ and interleavers $86_1$ to $86_4$, four different channels are formed based on the mutually orthogonal sequences stated above, and the baseband signals obtained at the outputs of the interleavers $86_1$ to $86_4$ are added together in the adder 104 and supplied to the frequency converter $75_1$. As a consequence, four mutually orthogonal radio channels sharing the same radio bandwidth are formed along the radio transmission path formed between the antennas $76_1$ and $76_2$, and the four portions of the transmission information are transmitted along the respective radio channels.

At the receiver 132, on the other hand, the combination of the random-sequence demodulators $78_1$ to $78_4$, integrate-and-dump filters $93_1$ to $93_4$, and decision circuits $80_1$ to $80_4$ performs the same processing as performed by the combination of the random-sequence demodulator 78, deinterleaver 87, and decision circuit 80 shown in FIG. 4, in parallel fashion on the received waves obtained via the four mutually orthogonal radio channels. Further, in the parallel-to-serial converter 105, the processing performed by the serial-to-parallel converter 103 in the transmitter 131 is reversed to process the four bit sequences obtained in parallel at the outputs of the decision circuits $80_1$ to $80_4$ as a result of the preceding processing, and the transmission information $d_n$ is thus recovered.

In this way, according to the present embodiment, the spread-spectrum communication system of the embodiment shown in FIG. 4, which is suitable for application to radio transmission channels whose transmission characteristics can fluctuate greatly, is modified to form a plurality of orthogonal transmission channels.

The above embodiment has assumed a single information source as the source of the transmission information $d_n$, but in applications where the information to be transmitted along the mutually orthogonal transmission channels is supplied in parallel from different information sources, for example, the transmitter 131 and the receiver 132 can be constructed by omitting the serial-to-parallel converter 103 and the parallel-to-serial converter 105, respectively, as shown by dotted lines in FIG. 13.

Figure 14:
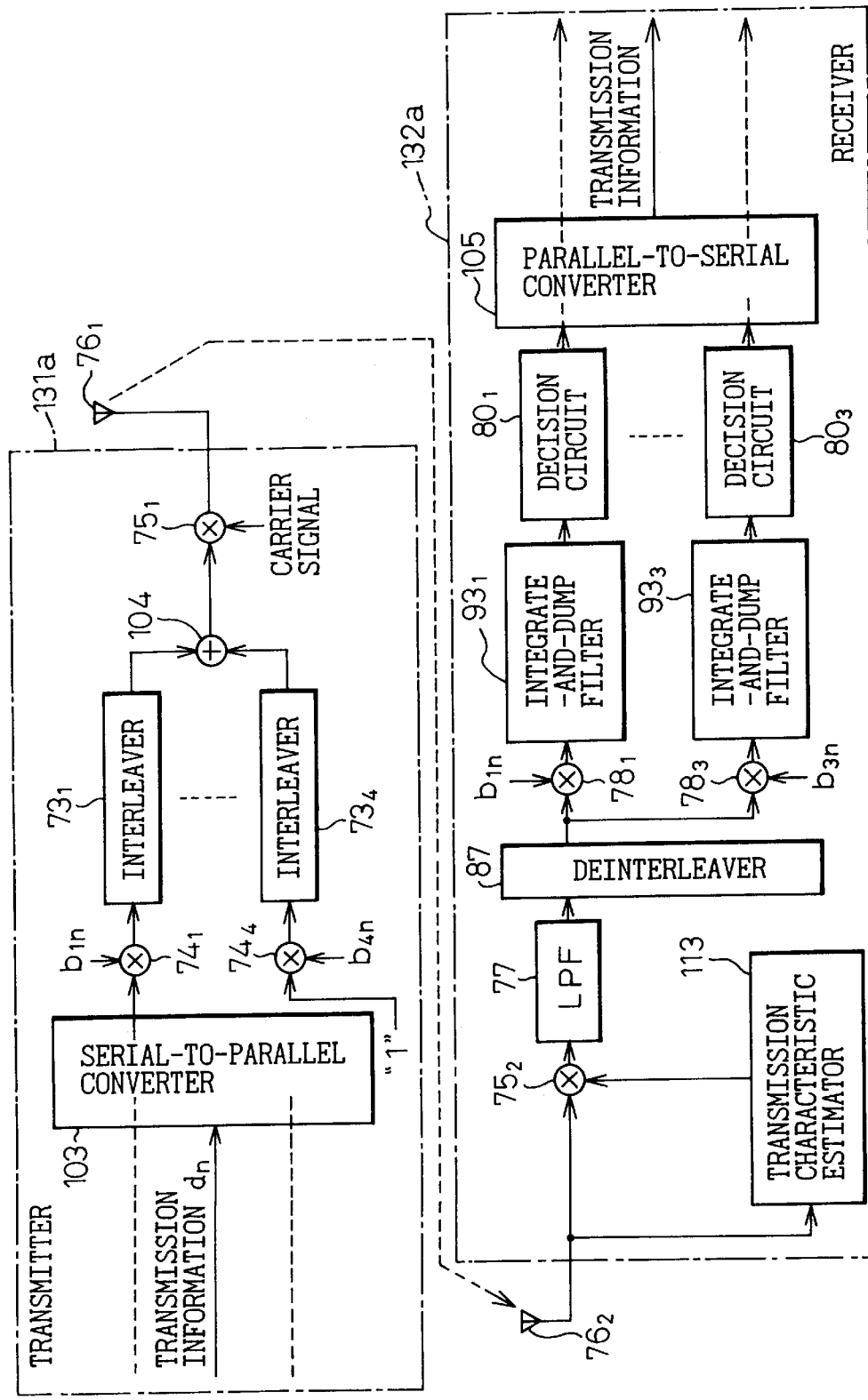
FIG. 14 is a block diagram of a spread-spectrum communication system according to a further embodiment of the present invention.

FIG. 14 is a diagram showing a further embodiment of the present invention.

The difference in configuration between the present embodiment and the embodiment shown in FIG. 13 lies in a transmitter 131a provided in place of the transmitter 131 and a receiver 132a provided in place of the receiver 132.

The transmitter 131a differs in configuration from the transmitter 131 in that the random-sequence modulator $74_4$ is supplied at an input thereof with a known bit sequence (for simplicity, it is assumed here that all bits take on a fixed logic value "1") without the intervention of the serial-to-parallel converter 103.

The receiver 132a differs in configuration from the receiver 132 in that the random-sequence demodulator $78_4$, the integrate-and-dump filter $93_4$, and the decision circuit $80_4$ are omitted, and in that a transmission characteristic estimator 113 is provided between the feed point of the antenna $76_2$ and the local oscillator input of the frequency converter $75_2$.

The configuration of the transmission characteristic estimator 113 is the same as that shown in FIG. 8, and the description and detailed illustration thereof are omitted here.

In the present embodiment, four mutually orthogonal radio channels are formed in the same manner as described in the embodiment of FIG. 13, but of these radio channels, the radio channel corresponding to the random-sequence modulator $74_4$ carries the bit sequence of all logic is as transmission information (pilot signal). Hereinafter, as in the embodiment of FIG. 8, the radio channel used for transmission of this transmission information will be referred to as the pilot channel.

Here, the pilot signal received through the pilot channel is equivalent to the received pilot signal in the embodiment of FIG. 8; therefore, as in that embodiment, the transmission characteristic estimator 113 provided in the receiver 132a monitors the pilot signal, and supplies the carrier signal, with the level and phase corrected for the radio channel transmission characteristics, to the local oscillator input of the frequency converter $75_2$.

In this way, according to the present embodiment, fluctuations of the radio channel transmission characteristics are constantly compensated for, and high transmission quality is maintained whether the power ratio in the channels used for transmission of the pilot channel and transmission information is at 0 dB or at −10 dB, for example, as shown in FIG. 9.

In the present embodiment, despreading of the pilot channel is performed prior to other processing, but the transmission characteristic estimator 113 is not limited to such configuration; for example, the transmission characteristic estimator 113 may be constructed from a combination of a random-sequence demodulator, integrate-and-dump filter, and decision circuit.

Figure 15:
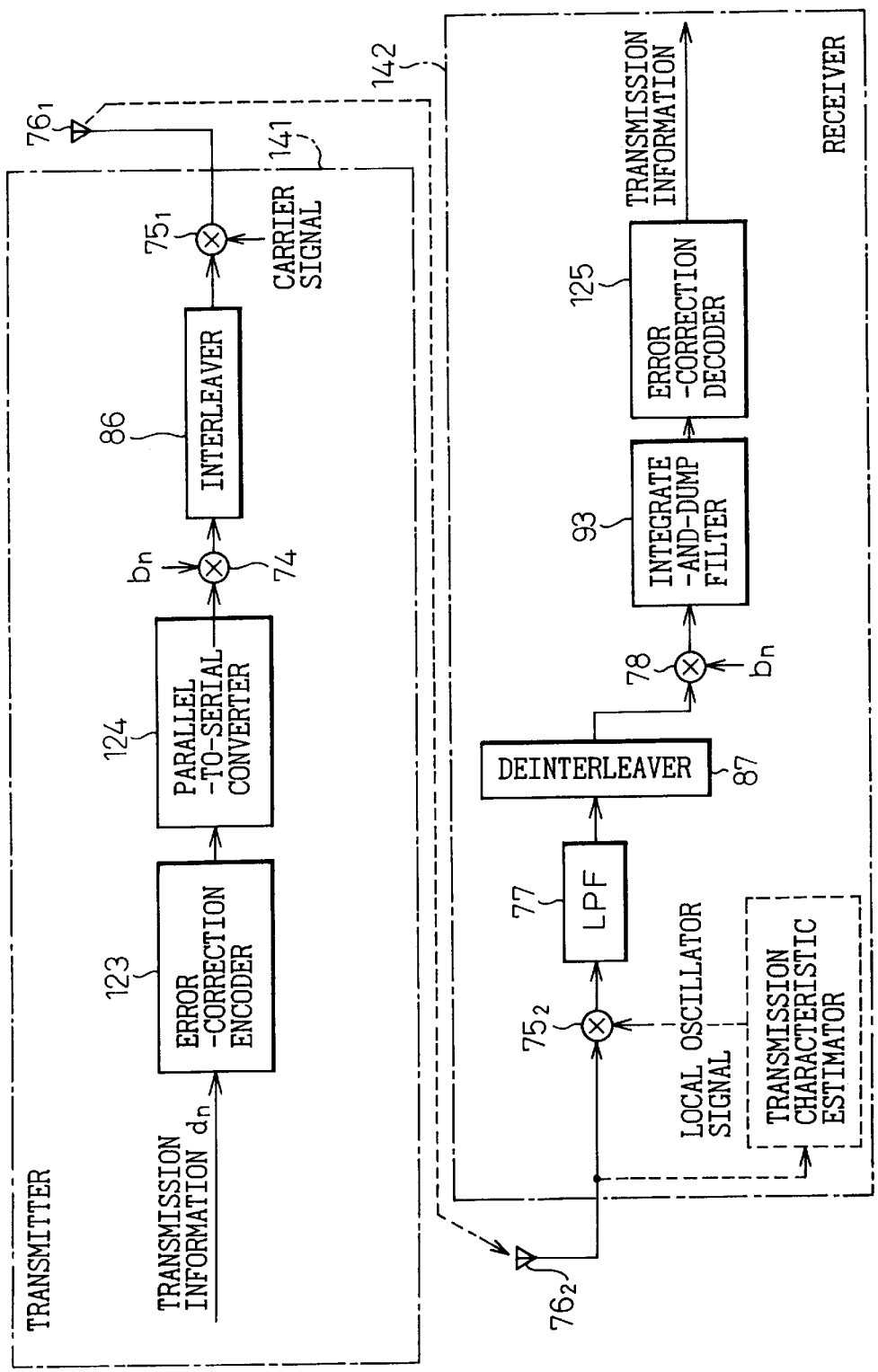
FIG. 15 is a block diagram of a spread-spectrum communication system according to a further embodiment of the present invention.

FIG. 15 is a diagram showing a further embodiment of the present invention. In FIG. 15, the parts identical in configuration to those shown in the embodiment of FIG. 4 are designated by the same reference numerals, and descriptions of such parts will not be repeated here.

The difference in configuration between the present embodiment and the embodiment shown in FIG. 4 lies in a transmitter 141 provided in place of the transmitter 84 and a receiver 142 provided in place of the receiver 85.

The transmitter 141 differs in configuration from the transmitter 84 in that an error-correction encoder 123 and a parallel-to-serial converter 124, connected in series, are provided before the random-sequence modulator 74.

The receiver 142 differs in configuration from the receiver 85 in that the decision circuit 80 is replaced by an error-correction decoder 125.

At the transmitter 141, the error-correction encoder 123 encodes the transmission information by using an error-correcting code usually employed for channel coding, prior to the modulation performed based on the RSS method. An error-correcting code of any type may be used as long as it matches the transmission characteristics and transmission rate of the radio transmission channel used, but for simplicity, the present embodiment assumes the use of a convolutional code with a code rate of ½, constraint length of 8, and generating polynomial of (247,371).

On the other hand, at the receiver 142, the error-correction decoder 125 decodes the bit sequence (received encoded sequence) supplied from the random-sequence demodulator 78 via the integrate-and-dump filter 93, by using a Viterbi decoding algorithm and a soft decision method.

Of the components constituting the transmitter 141 and receiver 142, the operation of other components than the error-correction encoder 123, parallel-to-serial converter 124, and error-correction decoder 125 is the same as the operation of the corresponding components described in the embodiment of FIG. 4, and therefore, their operational description will not be repeated here.

In this way, according to the present embodiment, since redundancy is introduced into the transmission information by error-correction coding prior to the modulation performed based on the RSS method, transmission quality can be improved without increasing the expansion factor, compared, for example, to the transmission quality obtained with the embodiment of FIG. 4 where 32×32 interleaving is applied and direct spreading coding is performed with an expansion factor of 32. This makes it possible to flexibly adjust the tradeoffs between the required transmission quality and the radio transmission channel utilization.

In the embodiments of FIGS. 10 and 15, the convolutional code is decoded based on the Viterbi decoding algorithm and soft decision method, but the present invention is not limited to such a configuration; rather, any type of error-correcting code, whether it is a block code or a convolutional code, can be used as long as it matches the fluctuation mode of the radio channel transmission characteristics and the transmission rate and format of the transmission information. Furthermore, the coding and decoding methods and the hardware configuration are not limited to any specific ones.

Figure 16:
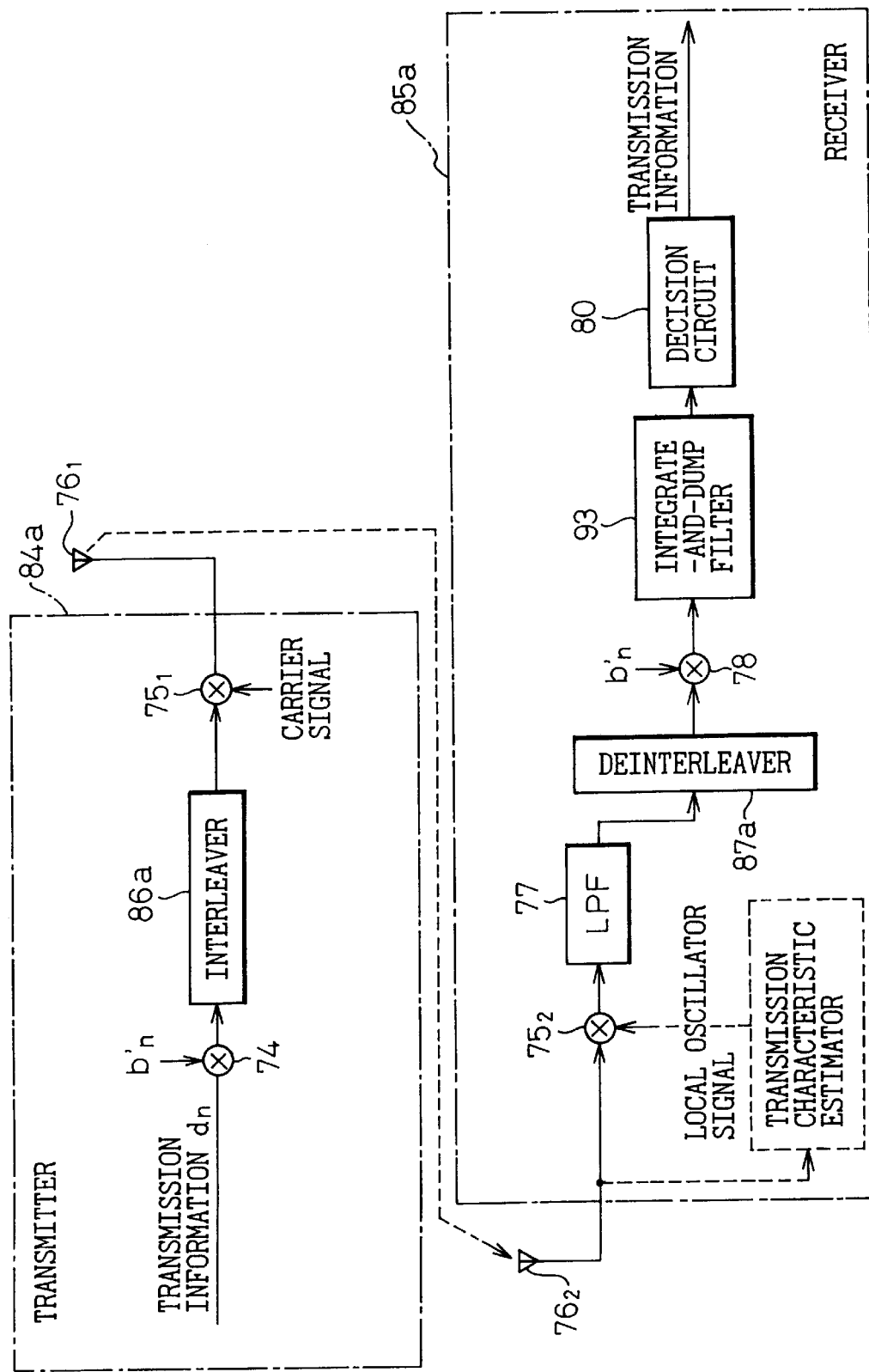
FIG. 16 is a block diagram of a spread-spectrum communication system according to a further embodiment of the present invention.

FIG. 16 is a diagram showing a further embodiment of the present invention.

The difference in configuration between the present embodiment and the embodiment shown in FIG. 4 lies in a transmitter 84a provided in place of the transmitter 84 and a receiver 85a provided in place of the receiver 85.

The transmitter 84a differs in configuration from the transmitter 84 in that the interleaver 86 is replaced by an interleaver 86a, and in that the code input of the random-sequence modulator 74 is supplied with a spreading code $b_n'$ instead of the spreading code $b_n$.

The receiver 85a differs in configuration from the receiver 85 in that the deinterleaver 87 is replaced by a deinterleaver 87a, and in that the code input of the random-sequence demodulator 78 is supplied with the spreading code $b_n'$ instead of the spreading code $b_n$.

At the transmitter 84a, the interleaver 86a takes as inputs the baseband signals $C_n'$ supplied via the random-sequence modulator 74, as will be described later, and repeatedly stores the baseband signals $C_n'$ in a matrix of N rows and M columns on a row-by-row basis in the order of ascending column numbers, as indicated by an arrow in FIG. 17, where M is given in relation to the integers $M_D$ and $M_R$ by the equation $$M = M_D \cdot M_R$$

When the values have been stored in the matrix, supposing that the matrix X of N rows and M columns is divided into $M_R$ submatrices $X_0$, $X_1$, $X_{MR-1}$ each having $M_D$ columns, the interleaver 86a reads out the values in the order of $X_0$, $X_1, \ldots, X_{MR-1}$ for output. The readout sequence in each sub-matrix is shown by dotted lines in FIG. 17.

With M ($M_D \cdot M_R$) denoting the expansion factor in the random sequence modulator 74, the results obtained by multiplying each information element (information bit, the basic element of the transmission information) by M ($M_D \cdot M_R$) spreading codes are stored in each row of the N-row, M-column matrix. Accordingly, with the above readout sequence, the M multiplication results obtained from each information element are divided into $M_R$ groups of $M_D$ results and arranged at intervals of $M_D \cdot N$. The baseband signals are thus distributed over a plurality of different timings along the time axis.

The random-sequence modulator 74 generates the baseband signals $C_n'$ by performing the operation expressed by the following equation on the spreading code $b_n'$ and the transmission information $d_n$.

$$C_n' = b_n' \cdot d_n$$

On the other hand, at the receiver 85a, the deinterleaver 87a reverses the above-described processing performed by the interleaver 86a, and the random-sequence demodulator 78 performs decoding, which is the reverse of the processing performed by the random-sequence modulator 74, based on the spreading code $b_n'$ likewise applied in synchronism with the received wave.

It should be noted here that when the result of interleaving the spreading code $b_n'$ in the interleaver 86a is equal to the spreading code $a_n'$ in FIG. 12, for the same transmission information the transmitter 84a in FIG. 16 produces the same output as the transmitter 91 in FIG. 12. Accordingly, the system of the embodiment shown in FIG. 16 also has advantages equivalent to those achieved by the system of FIG. 12.

In each of the above-described embodiments, the spreading code used is not specifically shown, but it will be appreciated that the spreading code is not limited to the PN code; rather, any other code, such as a Gold code, for example, may be used as long as it matches the method that introduces redundancy into the transmission information and spreads it out in the time domain, and it generates a sequence whose auto-correlation characteristic is steep and whose cross-correlation characteristic is mild.

Further, in each of the above-described embodiments, no explanation has been given of the synchronization control performed when generating in synchronism with the received waves the (orthogonal) carrier signals used for demodulation, but as techniques for implementing such synchronization control, a variety of techniques are known that can be applied to spread-spectrum communication systems.

What is claimed is:

1. A spread-spectrum communication method comprising the steps of:

spreading a spectrum of transmission information in such a manner that a plurality of chips, generated by spectrum spreading from each of information elements constituting the transmission information, are scattered along a time axis according to a prescribed rule;

transmitting the spread-spectrum transmission information;

receiving the spread-spectrum transmission information;

recovering the transmission information from the received spread-spectrum transmission information while integrating information of the chips generated from each information element and scattered along the time axis;

repeating a block of successive information elements a plurality of times, thereby generating a repeating information sequence; and applying a spreading code to the repeating information sequence, thereby generating the spread-spectrum transmission information with the plurality of chips, generated from each of the information elements, divided into a plurality of blocks and scattered at predetermined intervals.

2. A method according to claim 1, wherein the transmission information includes a plurality of parallel transmission information sequences, the step of generating the repeating information includes the step of generating the repeating information sequence for each of the plurality of parallel transmission information sequences, the step of applying the spreading code includes the step of applying a plurality of mutually orthogonal spreading codes to the plurality of repeating information sequences, respectively, thereby generating a plurality of spread-spectrum transmission information sequences, and the step of transmitting the spread-spectrum transmission information includes the step of combining the plurality of spread-spectrum transmission information sequences for transmission.

3. A method according to claim 2, wherein one of the plurality of parallel transmission information sequences is a pilot signal, and the step of recovering the transmission information from the spread-spectrum transmission information includes the step of correcting a phase and amplitude of the received spread-spectrum transmission information on the basis of a phase and amplitude of a recovered version of the pilot signal.

4. A method according to claim 1, further comprising the step of error-correction coding the transmission information prior to the generation of the repeating information.

5. A method according to claim 1, wherein, in the step of applying the spreading code, a spreading code whose rate is two or more times the rate of the repeating information is applied, and thereby, the chips generated from each of the information elements are divided into a plurality of blocks each including a plurality of chips and scattered.

6. A spread-spectrum communication system comprising:

means for spreading a spectrum of transmission information in such a manner that a plurality of chips, generated by spectrum spreading from each of information elements constituting the transmission information, are scattered along a time axis according to a prescribed rule;

means for transmitting the spread-spectrum transmission information;

means for receiving the spread-transmission information;

means for recovering the transmission information from the received spread-spectrum transmission information while integrating information of the chips generated from each information element and scattered along the time axis;

means for repeating a block of successive information elements a plurality of times, thereby generating repeating information; and means for applying a spreading code to the repeating information, thereby generating the spread-spectrum transmission information with the plurality of chips, generated from each of the information elements, divided into a plurality of blocks and scattered at predetermined intervals.

7. A system according to claim 6, wherein the transmission information includes a plurality of parallel transmission information sequences, the means for generating the repeating information includes means for generating repeating information for each of the plurality of parallel transmission information sequences, the means for applying the spreading code includes means for applying a plurality of mutually orthogonal spreading codes to the plurality of repeating information sequences respectively, thereby generating a plurality of spread-spectrum transmission information sequences, and the means for transmitting the spread-spectrum transmission information includes means for combining the plurality of spread-spectrum transmission information sequences for transmission.

8. A system according to claim 7, wherein one of the plurality of parallel transmission information sequences is a pilot signal, and the means for recovering the transmission information from the spread-spectrum transmission information includes means for correcting a phase and amplitude of the received spread-spectrum transmission information on the basis of a phase and amplitude of a recovered version of the pilot signal.

9. A system according to claim 6, further comprising means for error-correction coding the transmission information prior to the generation of the repeating information.

10. A system according to claim 6, wherein the means for applying the spreading code applies a spreading code whose rate is two or more times the rate of the repeating information, and thereby, the chips generated from each of the information elements are divided into a plurality of blocks each including a plurality of chips and scattered.

11. A transmitter for spread-spectrum communication comprising:

means for spreading a spectrum of transmission information in such a manner that a plurality of chips, generated by spectrum spreading from each of information elements constituting the transmission information, are scattered along a time axis according to a prescribed rule;

means for transmitting the spread-spectrum transmission information;

means for repeating a block of successive information elements a plurality of times, thereby generating repeating information; and means for applying a spreading code to the repeating information, thereby generating the spread spectrum transmission information with the plurality of chips, generated from each of the information elements, divided into a plurality of blocks and scattered at predetermined intervals.

12. A transmitter according to claim 11, wherein the transmission information includes a plurality of parallel transmission information sequences, the means for generating the repeating information includes means for generating repeating information for each of the plurality of parallel transmission information sequences, the means for applying the spreading code includes means for applying a plurality of mutually orthogonal spreading codes to the plurality of repeating information sequences respectively, thereby generating a plurality of spread-spectrum transmission information sequences, and the means for transmitting the spread-spectrum transmission information includes means for combining the plurality of spread-spectrum transmission information sequences for transmission.

13. A transmitter according to claim 12, wherein one of the plurality of parallel transmission information sequences is a pilot signal that is used in a receiver to correct a phase and amplitude of the spread-spectrum transmission information received in the receiver on the basis of a phase and amplitude of a recovered version of the pilot signal.

14. A transmitter according to claim 11, further comprising means for error-correction coding the transmission information prior to the generation of the repeating information.

15. A transmitter according to claim 11, wherein the means for applying the spreading code applies a spreading code whose rate is two or more times the rate of the repeating information, and thereby, the chips generated from each of the information elements are divided into a plurality of blocks each including a plurality of chips and scattered.

16. A receiver for spread-spectrum communication comprising:

means for receiving transmission information whose spectrum is spread in such a manner that a plurality of chips, generated by spectrum spreading from each of information elements constituting the transmission information, are scattered along a time axis according to a prescribed rule;

means for recovering the transmission information from the received spread-spectrum transmission information while integrating information of the chips generated from each information element and scattered along the time axis;

means for despreading the spread-spectrum transmission information by applying a spreading code thereto; and means for integrating the despread transmitted signal over a plurality of units by delaying the same by a predetermined number of units.

\* \* \* \* \*